(12) United States Patent
McCarty et al.

(10) Patent No.: US 6,389,816 B1
(45) Date of Patent: May 21, 2002

(54) SIMPLIFIED FUEL SYSTEM FOR JET ENGINES

(75) Inventors: Robert S. McCarty, Phoenix, AZ (US); Glen T. High, Bramhall Stockport (GB)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/625,700

(22) Filed: Jul. 25, 2000

(51) Int. Cl.[7] ................................................. F02C 9/26
(52) U.S. Cl. ........................................................ 60/773
(58) Field of Search .............................. 60/39.281, 734, 60/773

(56) References Cited

U.S. PATENT DOCUMENTS

| | | |
|---|---|---|
| 3,180,425 A | 4/1965 | Blackaby |
| 3,639,076 A | 2/1972 | Rowen |
| 3,726,086 A | 4/1973 | Herbstritt |
| 4,286,324 A | 8/1981 | Ingram |
| 4,380,148 A | 4/1983 | Burrage et al. |
| 4,716,723 A | 1/1988 | Ralston et al. |
| 4,736,582 A * | 4/1988 | Smith ...................... 60/39.281 |
| 5,261,222 A | 11/1993 | Napoli |
| 5,274,996 A | 1/1994 | Goff et al. |
| 5,315,819 A | 5/1994 | Page et al. |
| 5,440,490 A | 8/1995 | Summerfield |
| 5,715,674 A * | 2/1998 | Reuter et al. ............ 60/39.281 |
| 5,806,300 A * | 9/1998 | Veilleux et al. .......... 60/39.281 |

* cited by examiner

Primary Examiner—Louis J. Casaregola
(74) Attorney, Agent, or Firm—Robert Desmond, Esq.

(57) ABSTRACT

A fuel system for delivering fuel from a fuel source to combustor in a gas turbine engine has a pump receiving fuel flow from the fuel source and producing a pressurized fuel flow that flows to a flow meter that measures the fuel flow and generates a signal thereof. A bypass valve bypasses, to the input side of the pump, a portion of the pressurized fuel flow before it reaches the flow meter. An electronic control unit is included that receives the signal and in response thereto adjusts the bypass valve until the measured fuel flow equals a predetermined desired fuel flow stored in the electronic control unit. The fuel system is also self-calibrating.

20 Claims, 2 Drawing Sheets

SIMPLIFIED FUEL SYSTEM FOR JET ENGINES

This invention relates fuel system for jet engines or other types of gas turbine engines.

BACKGROUND OF THE INVENTION

FIG. 1 shows a typical fuel control system 10 for a gas turbine engine such as a jet propulsion engine. The system 10 includes in flow series arrangement a supply of fuel represented by arrow 12 which is fed to a boost pump 14 and then to a high pressure pump 16. From the high pressure pump 16 the fuel flow splits with a first portion flowing to a variable area metering valve 18 and a second portion to a delta-p valve 20 which bypasses fuel back to the upstream side of the high pressure pump 16 to set a fixed differential pressure, ΔP, across the metering valve 18. From the metering valve 18 the fuel flows through an ecology and pressurizing valve 22 which maintains a pressure level on the downstream side of the metering valve 18. The fuel then flows to a flow meter 24 which measures the fuel flow and provides a signal to the aircraft. From the flow meter 24 the fuel flows through a flow divider 26 and then to the primary and secondary fuel nozzles represented by arrows 28 and 30 which spray the fuel into the combustor of the engine.

A Full Authority Digital Engine Control (FADEC) 32 controls the operation of the engine including the fuel control system 10. In particular, the FADEC 32 adjusts the area of the metering valve 18 so that the fuel flow (Wf) exiting the metering valve is delivered in accordance with the following equation.

$$Wf=CA(\Delta P)^{1/2}$$

where C is a flow constant and A is the area of the metering valve. Though not shown, a linear variable displacement transducer, (LVDT), is mounted to the metering valve to provide a signal to the FADEC indicative of the position of the metering valve.

Disadvantages to this prior art fuel system are (a) the mechanical complexities required to maintain a constant metering valve differential pressure with varying altitude, (b) precision components like the LVDT are required to control metering area with varying temperature, and (c) the inherent inaccuracy of controlling fuel flow through indirect parameters such as area and pressure.

Accordingly, there is a need for a simplified fuel system for a jet engine that controls fuel flow based on measured fuel flow.

SUMMARY OF THE INVENTION

An object of the present invention is to provide a simplified fuel system that controls fuel flow based on measured fuel flow.

Another object of the present invention is to provide a fuel system that is self calibrating.

The present invention meets these objectives providing an a fuel system for delivering fuel from a fuel source to combustor in a gas turbine engine having a pump receiving fuel flow from the fuel source and producing a pressurized fuel flow that flows to a flow meter that measures the fuel flow and generates a signal Wfm thereof. A bypass valve bypasses, to the input side of the pump, a portion of the pressurized fuel flow before it reaches the flow meter. An electronic control unit is included that receives the Wfm signal and in response thereto adjusts the bypass valve until the measured fuel flow equals a predetermined desired fuel flow stored in the electronic control unit.

Thus, a fuel system is provided that control fuel flow based on measured fuel flow. Because it controls on measured fuel flow, a fuel system is simpler and hence more reliable than prior art fuel systems. The fuel system is also self-calibrating as is explained in the specification.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Figure 1:
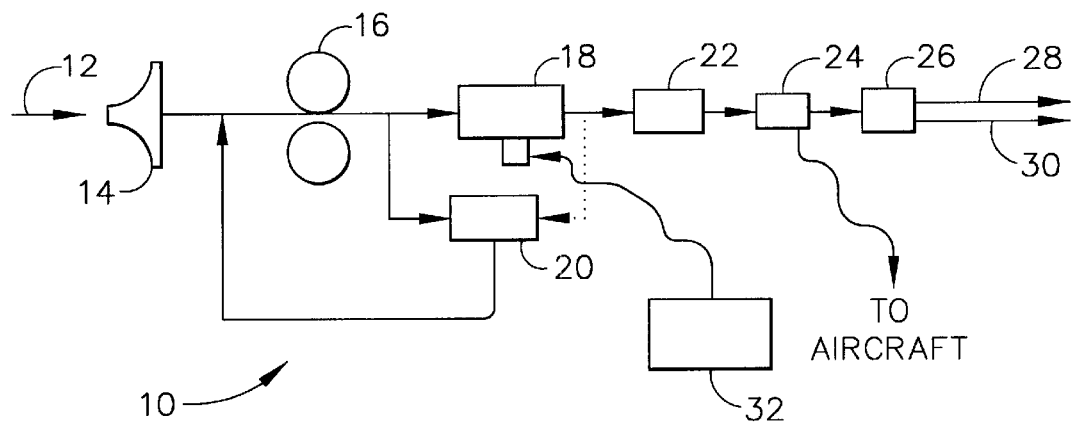
FIG. 1 is a schematic of a prior art jet engine fuel system.
Figure 2:
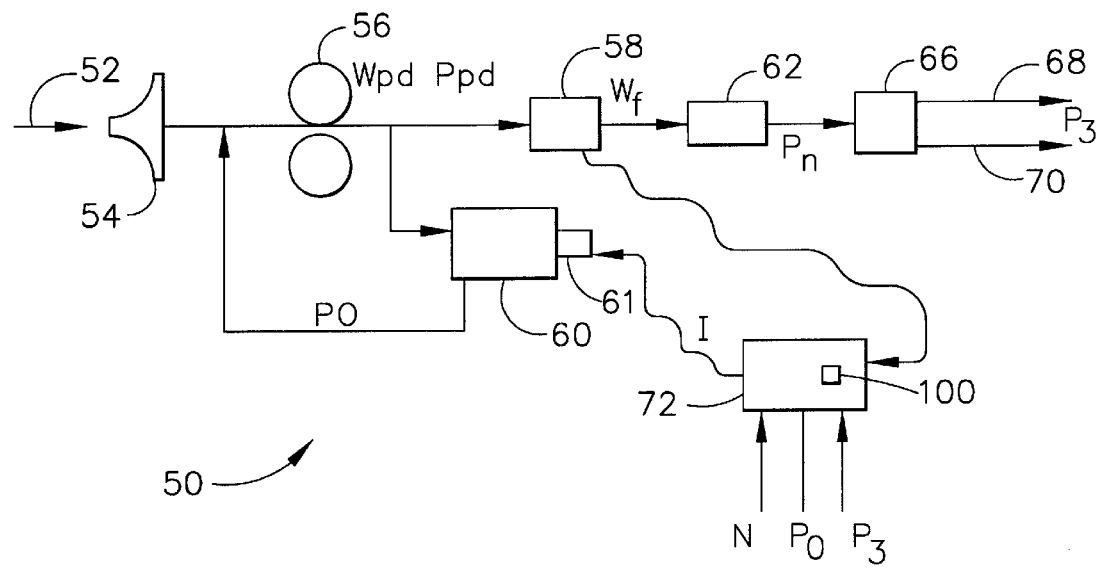
FIG. 2 is a schematic of the fuel system contemplated by the present invention.

Referring to FIG. 2, a simplified fuel control system is generally denoted by reference numeral 50. The system 50 comprises in flow series arrangement a supply of fuel represented by arrow 52 which is fed to a boost pump 54 and then to a high pressure pump 56. From the high pressure pump 56 the fuel flow splits with a first portion flowing to a flow meter 58 and a second portion to a bypass valve 60 which bypasses fuel back to the upstream or input side of the high pressure pump 56. The bypass valve is driven by a torque motor 61. From the flow meter 58 the fuel flows through an ecology and pressurizing valve 62 which maintains a pressure level on the downstream side of the flow meter 58, and then to a flow divider 66. From the flow divider 66 the fuel flows to the primary and secondary fuel nozzles represented by arrows 68 and 70 which spray the fuel into the combustor of the engine. In an alternative embodiment, where only a single fuel nozzle is used, the flow divider 66 can be eliminated. An electronic control unit 72 controls control the operation of the fuel system 50. In the preferred embodiment, the unit 72 is part of the Full Authority Digital Engine Control (FADEC) which controls the operation of the entire engine.

Figure 3:
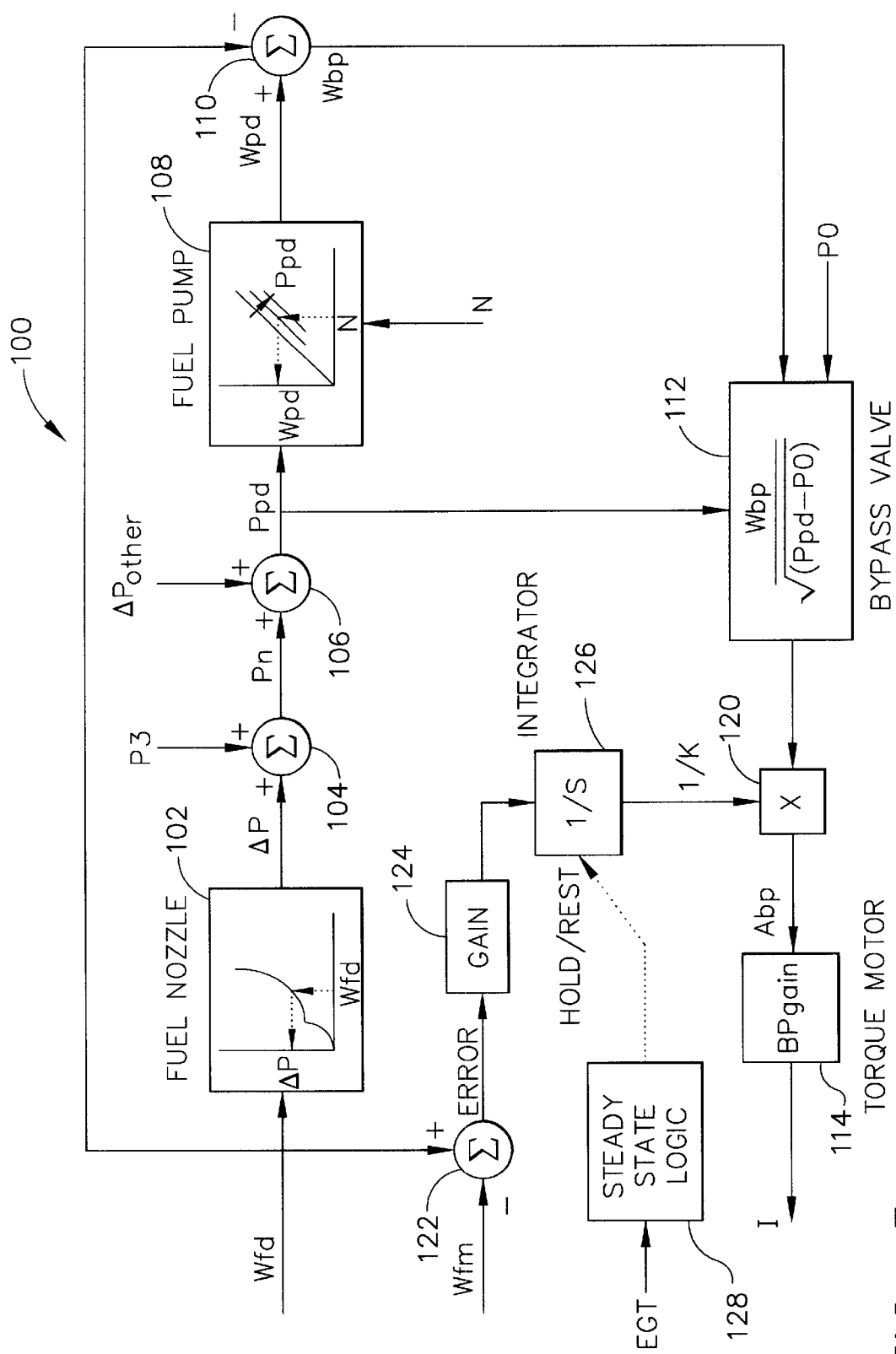
FIG. 3 is a block diagram of the control logic used with the fuel system of FIG. 2.

Referring to FIGS. 2 and 3, the FADEC 72 receives a signal N indicative of the rotational speed of the engine, a signal P3 indicative of the pressure in the combustor of the engine downstream of the fuel nozzles 68, 70, a P0 signal indicative of the pressure downstream of the bypass valve 60. These signals are generated by properly mounted sensors in a manner familiar to those skilled in the art. The FADEC 72 also has control logic that generates a desired fuel flow signal Wfd as a function of the operating conditions of the engine. An example of this type of control logic that is used during the start of the engine can be found in LaCroix, U.S. Pat. No. 4,337,615 which is assigned to the Assignee of this application. Other types of fuel schedules are used by the FADEC during the different modes of the engine. Electronically integrated into the FADEC 72 is a control system generally denoted by reference numeral 100 that adjust the bypass flow through bypass valve 60 until the measured fuel flow from the flow meter 58, Wfm, equals the desired fuel flow Wfd as determined by fuel schedules in the FADEC 72.

With continued reference to FIG. 3, the control system 100 has a function block 102 that contains a table, curve, or algorithm that relates fuel flow to the pressure drop across the fuel nozzles 68, 70 and fuel divider 66. This relationship is predetermined and programmed into the control system 100. The function block 102 generates a ΔP signal indicative of this pressure drop. This ΔP signal is added to the P3 signal in summer 104 to arrive at a signal indicative of the output pressure Pn of the ecology and pressurizing valve 62. In a summer 106 the Pn signal is added to a ΔPother signal indicative of the pressure drops across the ecology and pressurizing valve 62 and the flow meter 58. This ΔPother signal is programmed into the control system 100 and is determined through a calibration process familiar to those skilled in then art. The ΔPother signal is added to the Pn signal in summer 106 to arrive at a signal Ppd indicative of the high pressure pump 56 discharge pressure. Using the Ppd signal and the N signal, function block 108 generates a signal Wpd indicative of the fuel flow from the high pressure pump 56. Function block 108 contains a table, curve or algorithm that relates these parameters to Wpd. This relationship is programmed into the system 100 and is available from the pump manufacturer or can be determined through a calibration test on the pump 56. The Wpd signal from function block 108 is then added in summer 110 to the Wfd signal to arrive at a Wbp signal indicative of the bypass fuel flow fuel needed to obtain the desired fuel flow Wfd to the engine.

Function block 112 receives the Ppd signal, the Wbp signal and the P0 signal and then solves the following equation to arrive at a signal Abp indicative of the area of the bypass valve that results in the bypass flow Wbp.

$$Abp = Wbp/(Ppd-P0)^{1/2}$$

Function block 114 contains a curve, table, or algorithm that relates the area of the bypass valve 60 with the current to the torque motor 16. Using the Abp signal function block 114 generates the necessary current I which is then sent to the torque motor 61 which then moves the bypass valve 60. A multiplier 120 whose purpose is described later is disposed between the function block 112 and the function block 114. The control system 100 as described so far is designed to operate during transient engine conditions when the measurements from the flow meter 58 are not reliable. Under these circumstances the control system generates the necessary current I based on desired fuel flow only thus avoiding the unreliable fuel flow measurements.

A unique advantage to the fuel system 50 and the corresponding fuel control system 100 is that the flow meter 58 can be used for self calibration.

FIG. 3 also depicts a trimming circuit by which the system 100 can be trimmed to account for wear of the pump, changes in nozzle flow characteristics and other variations in the fuel system 50 that change over time. The trimming circuit includes a summer 122 that subtracts measured fuel flow signal Wfm from the flow meter 58 from the value desired fuel flow signal Wfd to generate an error signal. A gain 124 multiplies the error signal by the value of 1/K where K is initially set at a predetermined value based on calibration testing of the bypass valve 60. The gain takes the resulting product and stores it as a new 1/K. Disposed between the gain 124 and the multiplier 120 is an integrator 126 that integrates 1/K over time. The integrator would be "held" at its present value until other software represented by function block 128 in the controller 72 determined that "steady state" conditions were prevailing in the engine. This steady state logic could sample EGT or N over a period of time to determine that no significant changes are occurring. After this period of time is completed the integrator would be released to trim the value of 1/K as required by any new error between actual and desired fuel flow. The resulting 1/K is then multiplied with the Abp signal in the multiplier 120. Once the engine returns to transient conditions, the integrator is turned off and it holds it last value of 1/K until steady state conditions return.

Thus an improved and simplified fuel system is provided. This system eliminates expensive metering valves and LVDTs found in prior art systems and thus is more reliable. By eliminating the metering valve, the leakage for the entire system is reduced. This means that the pump 56 can be smaller which means bypass flows can be smaller reducing pump heating and increasing the life of the pump. Further the system is self calibrating which will extend the service life of the system 50.

Although the invention has been described in terms of a fuel system for a jet propulsion engine, it will be appreciated by those skilled in the art that the invention can be used with gas turbine engine fuel system. Accordingly, various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. A fuel system for delivering fuel from a fuel source to a combustor in a gas turbine engine comprising:
   a pump receiving a fuel flow from said fuel source and producing a pressurized fuel flow;
   a flow meter downstream of said pump and receiving said pressurized fuel flow directly from said pump, said flow meter measuring said pressurized fuel flow and generating a signal Wfm thereof;
   a bypass valve for bypassing a portion of said pressurized fuel flow before it reaches said flow meter to an input side of said pump; and
   an electronic control unit connected to receive as inputs said Wfm signal and at least one other signal indicative of engine fuel demand and having as stored data in said electronic control unit a predetermined desired fuel flow and being configured to calculate a corrected desired fuel flow from said inputs and said stored data and to adjust an area of said bypass valve to vary the portion of pressurized fuel bypassed to the input side of the pump until said measured pressurized fuel flow equals the corrected predetermined desired fuel flow.

2. The fuel system of claim 1 further comprising a pressurizing valve downstream of said flow meter and in fluid communication therewith.

3. The fuel system of claim 2 further comprising a fuel nozzle downstream of said pressurizing valve and in fluid communication therewith.

4. The fuel system of claim 2 further comprising a flow divider downstream of said pressurizing valve and in fluid communication therewith and a first and second fuel nozzle downstream of said flow divider and in fluid communication therewith.

5. The fuel system of claim 4 further comprising a boost pump between said fuel source and said pump.

6. The fuel system of claim 3 wherein said electronic control unit has a fuel control system comprising:
   means for generating a signal Wfd indicative of said desired fuel flow;
   a first function block receiving said Wfd signal and generating a signal ΔP indicative of the pressure drop across said fuel nozzle;

means for calculating the pressure at the output side of said pump using said ΔP signal and generating a signal Ppd thereof;

a second function block receiving said Ppd signal and generating a signal Wpd indicative of the said pressurized fuel flow;

a first summer for subtracting the Wfd signal from the Wpd signal and generating a signal Wbp indicative of this difference;

a third function block receiving said Ppd signal and said Wbp signal and generating a signal Abp indicative of the area of said bypass valve that results in the bypass flow Wbp; and a fourth function block receiving said Abp signal and generating a control signal for moving said bypass valve until the area of the bypass valve is equal to Abp.

7. The fuel system of claim 6 wherein said calculating means includes a second summer for adding the said ΔP signal to a P3 signal indicative of the pressure downstream of said nozzle.

8. The fuel, system of claim 7 wherein said calculating means further includes a third summer for adding the output of said second summer to a predetermined ΔPother signal indicative of the pressure drop across said pressurizing valve and said flow meter.

9. The fuel system of claim 6 wherein said second function block receives an engine condition signal.

10. The fuel system of claim 9 wherein said engine condition signal is engine speed.

11. The fuel system of claim 8 wherein said third function block receives a P0 signal indicative of the pressure on the downstream side of said bypass valve.

12. The fuel system of claim 11 wherein said third function block solves the equation Abp=Wbp/(Ppd−P0)$^{1/2}$.

13. The fuel system of claim 12 further comprising a trimming circuit for trimming the Abp signal.

14. The fuel system of claim 13 wherein said trimming circuit comprises:

to a fourth summer-for subtracting the Wfm signal from the Wfd signal to generate an error signal a gain for multiplying the error signal by a constant 1/K;

an integrator for integrating the product of the gain overtime; and a multiplier for multiplying the output of integrator with the Abp signal.

15. The fuel system of claim 13 wherein said trimming circuit further comprises a fifth function block for determining whether the engine is in steady state or transient and turning the integrator on or off in response thereto.

16. The fuel system of claim 1 wherein the at least one other signal indicative of engine fuel demand comprises at least one signal from the group consisting of a P0 signal indicative of a pressure on a downstream side of said bypass valve, a signal (N) indicative of a rotational speed of the engine, and a signal P3 indicative of a pressure in the combustor.

17. A fuel system for delivering fuel from a fuel source to combustor in a gas turbine engine comprising:

a pump receiving a fuel flow from said fuel source and producing a pressurized fuel flow;

a flow meter downstream of said pump and receiving said pressurized fuel flow directly from said pump, said flow meter measuring said pressurized fuel flow and generating a signal Wfm thereof; and an electronic control unit receiving said Wfm signal and in response thereto adjusting pressurized fuel flow to the combustor until said measured pressurized fuel flow equals a predetermined desired fuel flow stored in said electronic control unit;

wherein said adjusting pressurized fuel flow to the combustor consists essentially of adjusting a bypass valve for bypassing a portion of said pressurized fuel flow to an input side of said pump before the fluid flow reaches said flow meter.

18. The fuel system of claim 17 further comprising a fuel nozzle downstream of said flow meter and in fluid communication therewith.

19. The fuel system of claim 18 wherein said electronic control unit has a fuel control system comprising:

means for generating a signal Wfd indicative of said desired fuel flow;

a first function block receiving said Wfd signal and generating a signal ΔP indicative of a pressure drop across said fuel nozzle;

means for calculating the pressure at an output side of said pump using said ΔP signal and generating a signal Ppd thereof;

a second function block receiving said Ppd signal and generating a signal Wpd indicative of the said pressurized fuel flow;

a first summer for subtracting the Wfd signal from the Wpd signal and generating a signal Wbp indicative of this difference;

a third function block receiving said Ppd signal and said Wbp signal and generating a signal Abp indicative of an area of said bypass valve that results in the bypass flow Wbp; and a fourth function block receiving said Abp signal and generating a control signal for moving said bypass valve until the area of the bypass valve is equal to Abp.

20. A method for delivering fuel from a fuel source to combustor in a gas turbine engine comprising:

receiving a fuel flow from said fuel source and producing a pressurized fuel flow;

measuring said pressurized fuel flow and generating a signal Wfm thereof;

bypassing a portion of said pressurized fuel flow;

generating a signal P0 indicative of a pressure of said portion of said pressurized flow bypassed;

receiving as inputs said Wfm signal and said P0 signal;

storing data comprising a predetermined desired fuel flow;

calculating a corrected predetermined desired fuel flow from said inputs and said stored data; and varying the portion of pressurized fuel bypassed until said measured pressurize fuel flow equals the corrected predetermined desired fuel flow.

\* \* \* \* \*